INVENTOR.
Duncan B. Campbell
BY
R.W. Smith
ATTORNEY

Dec. 29, 1970            D. B. CAMPBELL            3,551,779

ELECTRIC DRIVE MOTOR LOGIC CONTROL SYSTEM

Original Filed Oct. 27, 1966            3 Sheets-Sheet 3

INVENTOR.
Duncan B. Campbell
BY
R.W. Smith
ATTORNEY

United States Patent Office 3,551,779
Patented Dec. 29, 1970

3,551,779
ELECTRIC DRIVE MOTOR LOGIC CONTROL SYSTEM
Duncan B. Campbell, Santa Barbara, Calif., assignor to General Motors Corporation, Detroit, Mich., a corporation of Delaware
Original application Oct. 27, 1966, Ser. No. 589,927, now Patent No. 3,477,022, dated Nov. 4, 1969. Divided and this application Apr. 14, 1969, Ser. No. 840,873
Int. Cl. H02m 1/08, 7/52
U.S. Cl. 321—5
5 Claims

ABSTRACT OF THE DISCLOSURE

A logic control system for controlling the gating of a controlled rectifier inverter circuit includes analog and digital circuits for developing inverter power pulses having a controlled duty cycle and frequency. A timing pulse generator synchronizes the operation of the internal logic circuit and controls the frequency at which power pulses are developed by the inverter. A duty cycle control circuit controls the pulse width of the power pulses in response to a desired power control signal. An internal clock circuit develops internal clock pulses which control the rate at which power pulses are developed in the time intervals between timing pulses.

---

This application is a division of application Ser. No. 589,927 now U.S. Pat. No. 3,477,022, filed Oct. 27, 1966.

This invention relates to an electric drive motor logic control system. More particularly, the invention relates to an analog-digital logic system for a variable speed motor supplied by power pulses having a controlled duty cycle and repetition rate.

With recent improvement of controlled rectifier elements it is possible to design motor control circuits utilizing a power inverter to produce precisely controlled pulses to a motor from a direct current source. These power inverters are designed to handle high current values and, therefore, to supply motors having high power ratings such as are required in vehicular electric drive systems. The controlled rectifier elements, while conducting relatively high currents, are controlled with low power signals from a logic control including static switching elements. The analog-digital logic circuit of this invention produces gating signals to the rectifier elements of a power inverter which in turn supplies multiphase power pulses to an induction motor. The logic circuit controls the motor speed and power output in response to manual command and a source of synchronizing timing signals provided in accordance with the motor speed and operating characteristics.

One of the objects of this invention is to provide a logic control circuit in a motor power supply for producing power turn-on and shut-off gating signals which are applied to a power inverter to produce controlled multiphase motor power pulses having variable pulse duration and occurring at a variable frequency.

A further object of this invention is to provide an analog-digital logic control circuit in a variable speed motor power supply to control the motor power output by providing signals to first, vary the power pulse repetition frequency in response to both externally supplied synchronizing timing pulses and internally produced free running clock pulses having variable frequencies and, secondly, to vary the duration of motor pulses and thus the motor torque by a duty cycle control circuit.

A still further object of this invention is to provide an analog-digital logic control circuit for producing low power gating signals to a power inverter having a variable frequency and variable duty cycle output in response first, to sources of both synchronizing timing pulses and variable frequency clock pulses and, secondly, in response to a duty cycle control circuit controlling the inverter pulse duration by comparing a desired duty cycle signal to the actual inverter pulse duty cycle whereby the duty cycle is maintained constant with changes in frequency when the selected desired duty cycle signal is held constant.

A still further object of this invention is to provide a motor power supply circuit synchronized by timing pulses occurring at a frequency dependent upon the motor frequency plus a programmed slip frequency which during selected speed ranges is held constant or is varied to thereby increase the maximum motor power output. The timing pulses are capable of producing power turn-on and shut-off signals, synchronizing internal clock signals of variable frequency, and also synchronizing a multiphase switching sequence produced by a power inverter. The synchronization of internal clock signals is provided concurrently with the switching from one phase to the next so that the clock signals supply symmetrical excitation to each motor phase winding.

A still further object of this invention is to provide a logic control circuit for supplying controlled gating signals to a power inverter in which the logic circuit is synchronized by timing pulses occurring in a frequency dependent upon combined motor frequencies and programmed slip frequencies. The timing pulses synchronize controlled rectifier elements of the inverter by synchronizing the gating signals in a three phase switching sequence every 60 electrical degrees. The inverter turn-on and shut-off gating signals are controlled by logic signals which include programmed delay periods between consecutive gating signals during predetermined motor ranges. Also the gating signal sequence is controlled whereby a shut-off signal must be provided before a turn-on signal and conversely a turn-on signal must be supplied before a shut-off gating signal can be applied.

A still further object of this invention is to provide a motor power supply circuit for controlling a vehicle electric drive motor in response to manually controlled motor power command signals and a source of timing pulse signals having an output frequency corresponding to the drive motor speed frequency plus a controllable slip frequency to increase the maximum available vehicle drive torque when the vehicle power source has a given maximum power capability.

And, a still further object of this invention is to provide a logic control circuit for controlling a power inverter producing three phase voltage pulses to a vehicle drive motor wherein the voltage pulses have a variable duty cycle and frequency responsive to logic timing signals. The timing signals have a frequency corresponding to the motor speed frequency and an added predetermined slip frequency. Manual logic command signals combined with the timing signals control and synchronize separate frequency determining and pulse width or duty cycle controlling logic circuits to thereby control the average voltage supplied to the drive motor. The logic circuits are controlled in accordance with signals proportional to motor voltage and speed so that the average motor excitation voltage is determined by pulses having predetermined variable frequencies, variable durations or predetermined combinations of both variable frequency and pulse duration.

Figure 1:
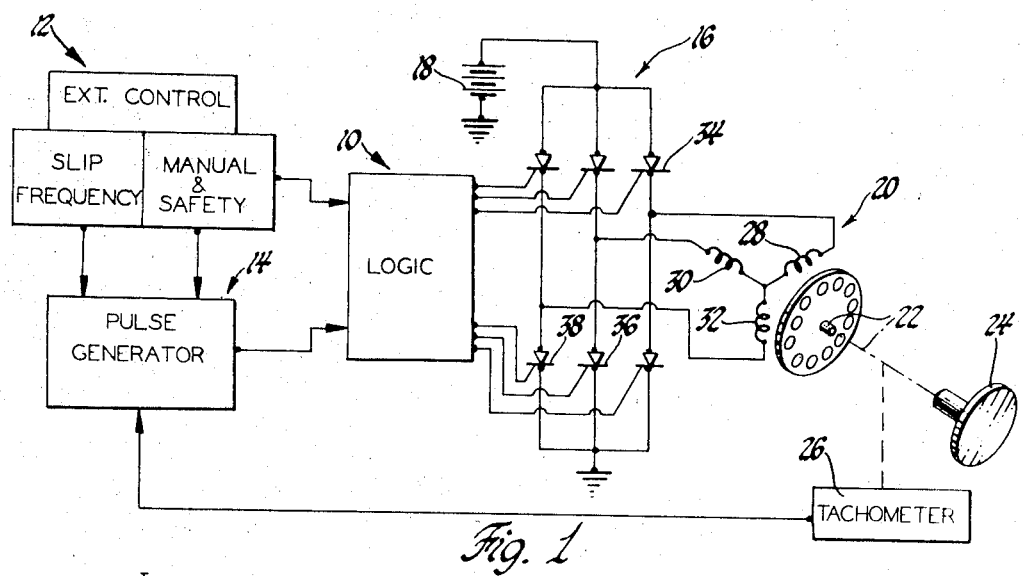
FIG. 1 is a block diagram of a motor supply system utilizing a logic circuit made in accordance with this invention for controlling a power inverter.

Referring now to the drawings and more particularly to FIG. 1 wherein a diagram is shown of a motor power supply utilizing a logic circuit 10 of this invention. External logic input control signals are connected to the logic circuit 10 from a control source shown generally at 12 and a timing pulse generator 14. The output of the logic circuit 10 is connected to the gate electrodes of an inverter circuit 16 having semiconductor controlled rectifiers with power supplied from DC source 18. This inverter preferably is of a type disclosed and claimed in copending application Ser. No. 779,018 for a Power Supply System which is a division of application Ser. No. 589,928, filed concurrently herewith and now abandoned, in which the inverter circuit includes six power controlled rectifiers. Power pulses of alternate polarity are supplied in a multiphase sequence in response to logic circuit trigger pulses to an induction motor 20. A squirrel cage rotor induction motor is shown having an output shaft 22 connected in driving relation to a load 24, for example, a vehicle wheel. Also, a motor speed sensing device 26, which may be a conventional electrical tachometer, is connected to the motor shaft 22 to supply electrical speed signals to the timing pulse generator 14.

Timing signals are supplied from the timing pulse generator 14 to synchronize the logic circuit operation and to control the gating signals applied to the inverter 16 so that the controlled rectifiers are switched in a three phase sequence. A three phase voltage appears at the motor input and passes through Y connected windings 28, 30 and 32 with changes in phase occurring every 60 electrical degrees. The phase voltage is applied as one polarity for 120 degrees, then off for 60 degrees and then in an opposite polarity for 120 degrees. After another 60 degree off period the cycle is repeated. For example, when a synchronizing timing pulse is supplied from the pulse generator 14 a positive phase voltage is developed across motor winding 28 with a negative phase voltage developed across winding 30 when controlled rectifiers 34 and 36 are gated on. Current from the source 18 is then conducted through the controlled rectifier 34, motor phase windings 28 and 30 and back through the controlled rectifier 36. After 60 electrical degrees the control rectifier 34 continues to conduct but the control rectifier 36 is shut off by a commutating capacitor means, not shown, and the control rectifier 38 is gated to conduction. Motor current continues to be applied through motor phase winding 28 but current has switched from winding 30 to 32. The remaining controlled rectifiers of the inverter circuit 16 are switched by gating signals from the logic circuit 10 to change motor phase current every 60 electrical degrees so that three phase power pulses are sequentially applied to the motor 20. The detailed operation of the power inverter 16 in response to the logic circuit turn-on and shut-off gating pulses is described in the above-mentioned copending application.

Figure 2:
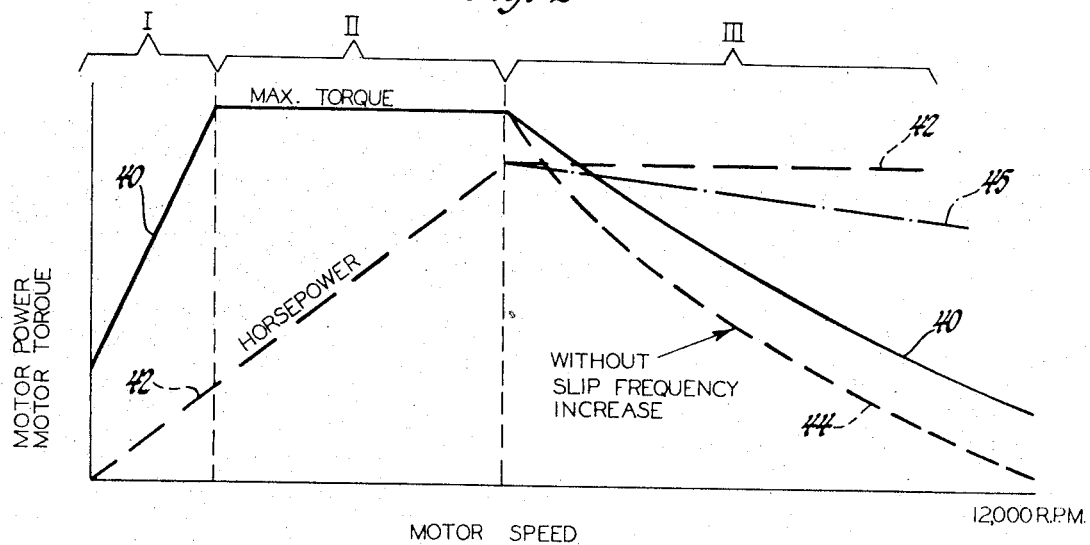
FIG. 2 illustrates a graph of the motor torque and horsepower outputs of a motor controlled by a logic circuit made in accordance with this invention.

When the motor 20 is connected to drive a vehicle the output power and maximum torque curves are shown in the graphs of FIG. 2. The maximum torque curve 40 and horsepower curve 42 of motor 20 includes three regions as indicated on the graph. Region I shows an increasing maximum torque with increasing motor speed to a selected point of motor speed. The motor is started from a stalled condition having a predetermined maximum starting torque and increases torque with speed to a predetermined maximum torque limit. The Region II includes a motor speed where the maximum torque is maintained constant with increased motor speed. In the Regions I and II the horsepower curve 42 increases at a rate proportional to the product of torque and speed. Although the curve 42 is shown essentially linear in Regions I and II, it is understood that in practice the rate of increase may not be linear. As the curves extend into Region III the power output 42 of the motor 20 is maintained essentially constant because it is limited by the capacity of the power source 18 which may be a battery, fuel cell or other energy conversion electrical source. Accordingly, as motor speed increase the maximum torque curve 40 decreases.

Figure 3:
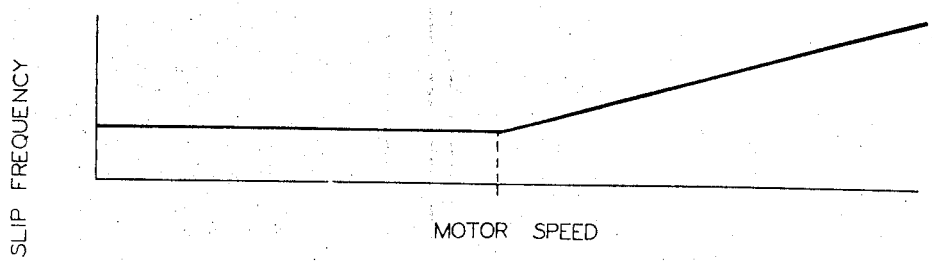
FIG. 3 is a graph of a programmed slip frequency utilized in the logic circuit of this invention to provide the motor output power and torque shown in the graph of FIG. 2.

In FIG. 3 there is shown a graph of slip frequency which is maintained constant up to a motor speed corresponding to the end of Region II in FIG. 2 and then is increased to a maximum at a speed which corresponds to end of the motor speed range. By way of example but not limitation, the motor speed may extend from stall to about 12,000 r.p.m. In copending application S.N. 295,954, now Pat. No. 3,323,032, filed July 18, 1963, and assigned to the assignee of this application, a constant slip frequency system is disclosed that provides an induction motor with speed-torque characteristics similar to those of a DC series motor. In Region III of FIG. 2, a dashed line 44 shows the maximum motor torque and the dash-dot line 45 shows the output power produced if the slip frequency is maintained constant in the motor speed range of Region III. It has been found that by increasing slip frequency the maximum torque is increased and accordingly the motor power and consequently a constant horsepower range can be provided in Region III. Also, the power output of DC source 18 is maintained along its loci of maximum power. The increased slip frequency lowers the motor impedance and the counter E.M.F. which opposes the voltage of source 18. With less opposing voltage the power source voltage is effective in producing more rotor current and thus increased torque. The slip frequency must be limited since the motor losses also increase with increased slip frequency. For example, the constant slip frequency can be provided at a frequency between 4 to 5 c.p.s. in motor speed Regions I and II and then increased to a maximum slip frequency between 10 to 15 c.p.s. The curve of slip frequency shown is determined so there is an optimum increase of torque at the higher motor speeds without serious motor losses when the output voltage and power of the power source 18 are at fixed maximum values.

It is to be noted that in FIG. 2 the maximum torque curve in Region I is increased from a desired maximum torque at stall to a peak level of maximum torque because at lower motor speeds the motor impedance and counter E.M.F. are low and high reactive currents occur when the motor phase windings are switched. These reactive currents must be limited so as not to exceed the current capacities of the inverter controlled rectifiers. Also when the motor power supply is used in the mechanical drive system of a vehicle, there are inherent vehicle maximum torque limitations when startng from rest. Therefore, it has been found that with a given maximum power source voltage of approximately 500 volts, for example, that an average value of only 20 volts can be applied to the motor at low speeds whereas when the full voltage of 500 volts is applied at high speeds there is produced the same torque. This occurs since the motor counter E.M.F. increases to oppose the power source voltage.

As noted above, the average motor excitation voltage is controlled to vary the motor torque by applying variable frequency and also variable duty cycle power pulses to the motor. The pulse duty cycle refers to the ratio of the power pulse width to the total pulse period or more generally, the ratio of the sum of plural pulse widths to a given time period. The pulse frequency or repetition rate refers to the number of power pulses generated in a given period. The basic frequency of the logic circuit, and therefore, the inverter circuit is determined by the timing pulse generator 14 which provides synchronizing pulses at a frequency equal to six times the combined motor speed, as detected by the tachometer device 26, and a predetermined slip frequency, provided from the external logic control 12.

In brief, to provide the graphs of motor characteristics of FIGS. 2 and 3, inverter gating pulses are supplied from the logic circuit with each timing pulse, at the 60 electrical degree time, and also with internal clock pulses when occurring between the timing pulses. The amplitude of each voltage pulse applied to the motor is determined by the power source 18 but pulse repetition and duration is modulated by the logic circuit to control the average pulse voltage. At lowest speeds, control by frequency or repetition rate occurs with between one to ten inverter gating pulses being produced between the 60 electrical degree synchronizing pulses. At slightly higher motor speeds anywhere between one to nine pulses can occur. Smooth transition occurs as motor speed increases through a predetermined speed which, by way of example, may be 1500 r.p.m. where a maximum of four pulses can occur. As the motor speed increases from the selected range of approximately 1500 to 2500 r.p.m., for example, there is a time interval for only three pulses between the 60 electrical degree timing pulses and, accordingly, between a range of 2500 and 5000 r.p.m., for example, two pulses per 60 degree period can be used. Above the 500 r.p.m. speed only one power pulse will occur per 60 degree period and this power pulse is accordingly produced by each timing pulse. Throughout all speed ranges the conduction time of the control rectifiers is being varied to vary the duty cycle so that average voltage is controlled by control of both pulse frequency and duration to produce smooth changes in the motor output power.

It is to be kept in mind that while the pulses may be maintained at a given duration, the average voltage applied to the motor will increase with increased frequencies since the pulses will be occurring at increased repetition rates.

Figure 4:
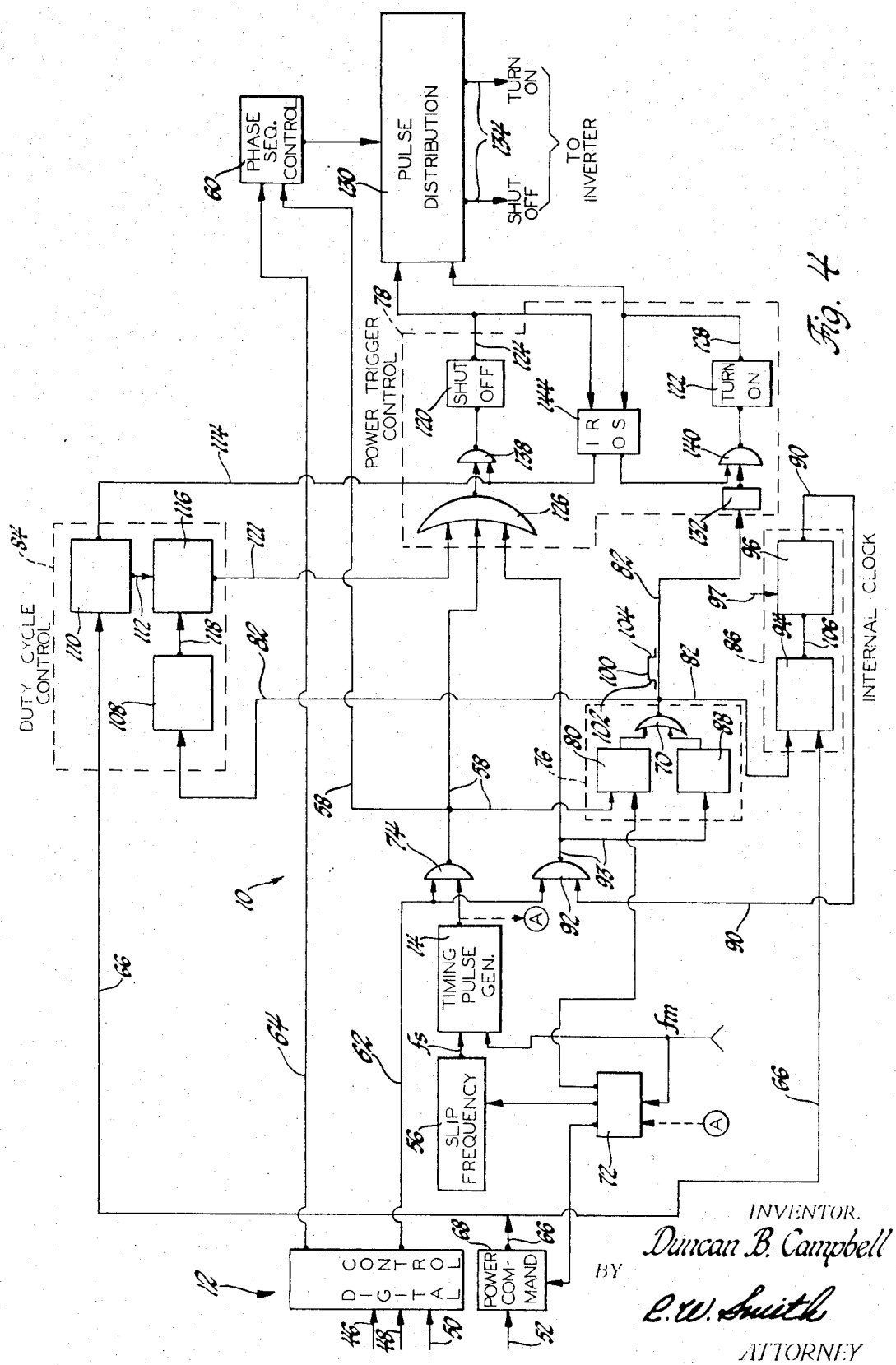
FIG. 4 is a schematic diagram of a logic control circuit made in accordance with this invention.

Referring now to FIG. 4 wherein the logic control circuit of this invention is shown, external command signals are applied to the input of the logic circuit from external controls 12. The command signals include safety monitoring input 46 and manually operated signals including on-off input 48, forward-reverse input 50 and power command 52 which in a vehicle corresponds to throttle position.

The external control 12 includes a source 56 of programmed slip frequency signals $fs$ which are applied to the timing pulse generator 14. The timing pulse generator 14 provides timing signals to the logic circuit 10 at a frequency corresponding to an integral multiple of the combined motor rotor frequency plus slip frequency. The added slip frequency $fs$ and the motor speed frequency $fm$ are conveniently added in the timing pulse generator and also frequency multiplied by a conventional frequency multiplication circuit means to provide a signal six times the frequency of $fs$ plus $fm$. The pulse frequency output of timing pulse generator 14 occurs at six times the inverter frequency which is the synchronous frequency of the applied motor excitation. Acordingly, a three phase sequence is produced in the inverter 16 in which a phase change occurs six times during one inverter cycle or every 60 electrical degrees. To provide the phase sequency, timing pulses from generator 14 are generated on output lines 58 with one line being applied to a phase sequence control 60 which includes a binary counting means for producing a three-phase sequence. The manual command signals from controls 12 include line 64 which provides a logic control signal to circuit 60 from forward-reverse command input 50 to reverse the phase sequence of the binary counting and thus the inverter phase sequence.

Safety monitoring signals from 46 are combined on line 62 with the on-off command applied at 48 so that logic GO–NO GO signals are provided and in the event of a malfunction the logic will be turned off. Also the GO–NO GO signal may be responsive to an off throttle position, when a throttle position controls the power command. In such a case no logic output signals are produced and the inverter is turned off so that no power from the power source is used. The power command or throttle input 52 is applied to a power command circuit 68 where it is combined with a motor speed signal $fm$. The motor speed signal is combined with the power command in circuit 68 and a signal is provided on the output lines 66 that is proportional to the desired average motor voltage which accordingly is a function of both the desired power and the motor speed. The motor speed signal $fm$ is also applied to the programmed slip frequency control 56 to vary the slip frequency signal in accordance with the motor speed as explained above. The speed signal $fm$ applied to the power command circuit 68 and the slip frequency circuit 56 may be provided alternatively from point A at the output of timing pulse generator 14 to the circuit junction 72. The timing pulses are sufficiently approximate to the actual motor speed that the point A may be used as a convenient circuit connection from the logic to the junction 72 in providing motor speed reference signals to circuits 56, 68 and a third logic circuit explained in further detail below.

Referring now in further detail to FIG. 4 and the circuits of the logic control 10 wherein are shown block diagrams of conventional circuits having gating, delay and pulse producing functions known in logic systems and will not be described in detail. For example, the circuit includes AND and OR gating circuits although analogous circuits such as NAND and NOR circuits can be used to perform analogous logic functions. To start and synchronize the logic circuit, timing pulse generator 14 is connected to an AND logic gate 74 along with the GO–NO GO signal from line 62. A GO signal must be present before pulses of the timing pulse generator can be coupled through the gate 74 to line 58. The timing pulses on line 58 are applied to a reset circuit 76, a power control trigger network 78, and as noted above, the phase sequence control 60. The timing pulses applied to reset circuit 76 are connected to the input of a variable pulse width generator 80 which is described in detail below. The width of the pulses supplied from the variable pulse circuit 80 is determined by a motor speed signal $fm$ which is the third output from junction 72. The output of the reset circuit 76 provides a reset pulse 100 on output lines 82 which is connected to a duty cycle control circuit 84, the power control trigger circuit 78 and an internal clock circuit 86. Synchronization by the reset pulse is provided by simultaneously starting the circuits 84 and 86 and, after a predetermined time-delay, producing a turn-on trigger pulse from circuit 78. Also included in the reset circuit 76 is a second pulse generator circuit 88 which may be a monostable multivibrator having a fixed pulse width output and an input supplied from internal clock circuit 86, output line 90, through an AND logic gate 92 and line 93. The GO-NO GO signal from line 62 is applied to AND gate 92 as well as AND gate 74 to enable the gates so as to pass signals only when GO logic command signal is present. The pulse circuits 80 and 88 produce a reset pulse 100 on line 82 through OR gate 70 and accordingly it can be seen that the reset circuit 76 will produce a reset pulse from either circuit or both in which case the output pulses will overlap.

The function of the internal clock circuit 86 is to supply variable frequency pulses as feedback pulses to the reset circuit 76 and also as shut-off signals to power trigger network 78. Circuit 86 includes a ramp voltage source 94 and a comparator circuit 96. One input to ramp voltage source 94 is the reset pulse 100 from line 82 and the second input is the desired average motor voltage signal from line 66. The leading edge 102 of a reset pulse 100 causes the ramp circuit 94 to reset or return to its starting level. At the trailing edge 104 of reset pulse 100, the voltage is removed and the ramp voltage is released and begins to rise. The desired motor voltage signal from line 66 varies the rate of rise of the ramp voltage developed in the ramp voltage source 94. Comparator 96 receives the ramp voltage applied on line 106 and a clock pulse is generated when the ramp voltage reaches a fixed reference level provided by a voltage on an input line 97 to provide an internal clock pulse on line 90. This clock pulse is applied through the AND gate 92 to the pulse generator 88 in circuit 76 in a closed feedback loop. The internal clock circuit 86, reset circuit 76 and the AND gate 92 form an oscillatory network with clock pulses being produced at variable repetition rates. The repetition rate is varied by the combined duration of the pulse from circuit 88 and the variable rate of rise of the ramp voltage of circuit 94. For example, with a power command signal being applied, the frequency of the pulses varies from 32 c.p.s. to 1400 c.p.s. as the power command input 52 or motor speed increases. At low motor speeds and with a maximum repetition rate up to 10 pulses can be provided between consecutive timing pulses.

Concurrently, reset pulses on line 82 are also applied to the duty cycle control 84. The duty cycle control 84 includes a ramp voltage source 108 producing a ramp voltage having a fixed linear rate of rise. An error detector circuit 110 receives the desired average motor voltage signal from line 66. Since the average voltage is determined by the duty cycle of pulses produced by the inverter, the desired average motor voltage corresponds to the desired duty cycle. The duty cycle error detector 110 includes a conventional differential input integrating circuit that compares a signal proportional to the duty cycle of the inverter pulses from line 114 with the desired duty cycle which is proportional to the desired average motor voltage. The difference between these two signals forms an error signal which is integrated with respect to a constant predetermined time period to develop a duty cycle DC reference voltage on line 112. A comparator circuit 116 compares the reference voltage of line 112 with the constant rate of rise ramp voltage on line 118. When the ramp voltage reaches the duty cycle reference voltage of line 112 an output pulse is provided from comparator 116 on line 121 as a shut-off logic signal to power control trigger network 78. A steady state operation can be achieved so that zero error exists between the desired motor voltage duty cycle signal on line 66 and actual duty cycle signal on line 114. The shut-off logic signal from the duty cycle control on line 121 terminates the power pulses so that a constant duty cycle can be maintained depending upon the power command signal. A constant duty cycle provides a constant average voltage. This is controlled in the error detector 110 by integrating the pulse widths which define each duty cycle over a predetermined time period so that the product of integration will remain constant throughout the frequency ranges of the inverter and therefore of the motor, i.e. if the pulse frequency doubles the pulse widths are halved, etc. No matter how asymmetrical the pulse wave may be on line 114, the duty cycle will remain constant for a given desired voltage command on line 66.

Turning now to the output of the logic circuit which is provided by power control trigger network 78 and pulse distribution circuit 130. Network 78 includes a shut-off pulse generator 120 and a turn on pulse generator 122. Shut-off trigger pulses are generated on line 124 in response to pulses provided from the AND logic gate 138 and OR gate 126. A shut-off trigger pulse is produced whenever pulses are applied to OR gate 126 from the duty cycle control 84 or the timing pulse generator on line 58 or from the internal clock circuit on line 93. The turn-on pulse generator 122 produces a turn-on trigger pulse on line 128 whenever it receives an input coupled through AND gate 140 from the inverter and differentiating circuit 132 which provides a spike voltage at the trailing edge 104 of the reset pulse 100. The shut off and turn on pulses are respectively applied to lines 124 and 128 and connected to the pulse distribution circuit 130. The pulse distribution circuit 130 includes an arrangement of binary logic circuits which are activated by the pulses from the conventional binary counting circuit and phase sequence control signals within circuit 60. The turn-on and shut-off trigger pulses on lines 124 and 128 form turn-on and shut-off gating signals on lines 134 which are connected to the controlled rectifiers within the aforementioned inverter circuit 16.

In order that shut-off and turn-on pulse will not appear without the other pulse having occurred first, a power trigger sequence control is provided by the AND gates 138, 140, and a bistable multivibrator circuit 144. The bistable circuit 144 will change to one logic state whenever a turn-on trigger pulse is generated, and to the other state when a shut-off trigger pulse is generated. The 1 output of bistable 144 is the complement of the 0 output such that one of the outputs is at a high voltage level when the other is at a low voltage level. One input to gate 140 is the differentiated and inverted voltage spike from circuit 132 and if the other input, from the 0 output of bistable 144, is high the differentiated positive going pulse is coupled to 122 wherein a power turn-on trigger is generated. Upon the falling edge of the turn-on trigger pulse the bistable multivibrator 144 is set so that the 0 output goes low and AND gate 140 is disabled and also the 1 output of 144 goes high so that AND gate 138 is enabled. The logic pulse signal from the duty cycle control on line 121 is coupled through OR gate 126 to AND gate 138. Since the other input to gate 138 is high, the pulse from line 121 is further coupled to pulse generator 120 wherein a power shut off trigger is produced. The trailing edge of the shut-off trigger pulse on line 124 resets the bistable multivibrator 144 so that gate 138 is disabled and gate 140 is enabled. The result of this action of bistable multivibrator 144 is to require an alternate gating sequence in the inverter of power turn-on before power shut-off and power shut-off before power turn-on.

Figures 5, 6:
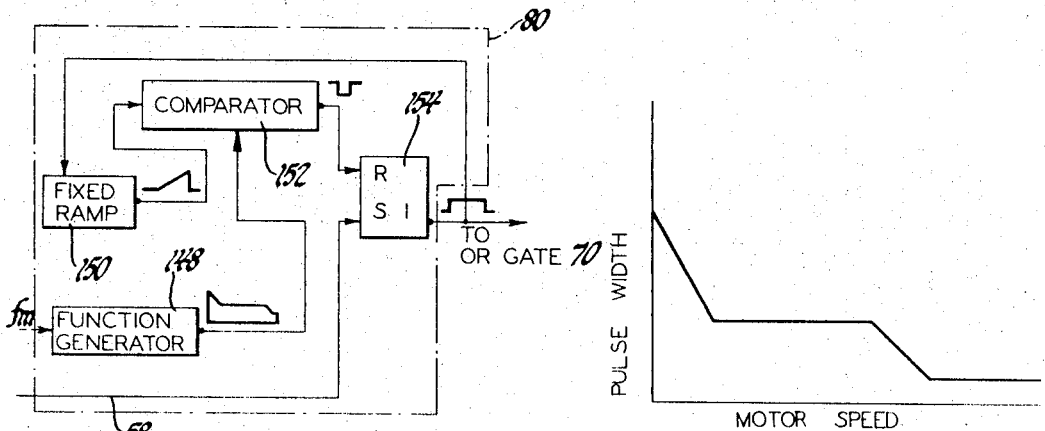
FIG. 5 is a block diagram of a circuit for producing a variable delay pulse utilized in the logic circuit made in accordance with this invention.
FIG. 6 is a graph of the variation of pulse width with changes in motor speed provided in the circuit shown in FIG. 5.

In FIGS. 5 and 6 the circuit of variable pulse width generator 80 in the reset circuit 76 is shown in more detail. The circuit includes a function generator 148, a fixed ramp voltage source 150, a DC voltage level comparator 152 and a bi-stable multivibrator circuit 154. The function generator 148 includes a diode-resistance network which develops a voltage wave shape that is proportional to the shape of the curve shown in FIG. 6 from the motor frequency signal $f_m$. The curve profile shows first, a downward slope starting at a high value which corresponds to a higher voltage or longer pulse width produced at the output of pulse generator 80. The ramp voltage from source 150 will rise until the reference voltage is reached and the comparator 152 produces a trigger pulse to bistable circuit 154. The output pulse from one output of the bistable 154 is initiated by a timing pulse occurring on line 58 with a second bistable output being connected to the ramp voltage source 150 so that it is unclamped and starts rising. The output of 154 will return to their original state when the ramp voltage reaches the reference level of function generator voltage. Accordingly, it is seen that the pulse duration of the output from bistable 154, which is applied to OR gate 70, is determined by the voltage level produced in function generator 148.

The voltage output of the function generator is proportional to the graph of FIG. 6 which indicates that a longer pulse width is programmed at the output of pulse generator 80 at lower motor speeds than at higher motor speeds. The function of the variable pulse is to provide a delay time in the reset pulse 100 pulse width so that the power controlled rectifier elements of the inverter are provided with a time delay or dead time after shut-off as the motor phase current is switched. The first region of FIG. 6 is a transition from the longest pulse width to a constant region and then a second transition region to the shortest width which remains constant from approximately the middle to the highest motor speeds. The reset pulse 100 provided at the output of OR gate 70 controls the time delay required for proper operation of the inverter. This time delay may be referred to as a dead time which is initiated coincident with either the timing pulses occurring on line 58 or internal clock pulses on line 93 which have a dead time duration dependent upon the pulses from pulse generators 88 or 90 or both if the pulses overlap. This so called dead time allows for the dissipation of reactive motor currents to permissible levels and also the recharging of the inverter commutating circuit. Thus, the delay or dead time starts with a timing pulse or internal clock pulse which will produce a shut-off trigger pulse, if prior thereto there was turn-on trigger, and secondly, start reset of ramp voltages in circuits 84 and 86. At the end of the dead time occurring at the trailing edge of the reset pulse 100, a turn-on pulse from generator 122 is produced.

In summary, the purse of the delay provided by the profile of the curve of FIG. 6 is to control the dead time or period between successive shut-off and turn-on trigger pulses. At low speeds the reactive motor current decays slowly because of low motor impedance. Therefore, if a second pulse is applied too soon the reactive current will not have decayed sufficiently and too large a current will be conducted by the inverter control rectifier. The inverter will then be required to shut off a very high current whereas if the pulses are sufficiently spaced the current being shut-off will be lessened. As the motor speed increases toward the mid-speed range the reactive current is decreased but sufficient delay must be allowed to permit the inverter commutating circuit to recycle. After the motor speed reaches the mid-speed range there are no pulses between the timing pulses so that sufficient time is provided for recycling the inverter. The delay time is then rapidly programmed to provide the minimum delay required through the higher motor speeds. It is necessary to keep the dead time at a minimum in the higher speed ranges since this decreases the duty cycle or average voltage supplied to the motor.

Figure 7:
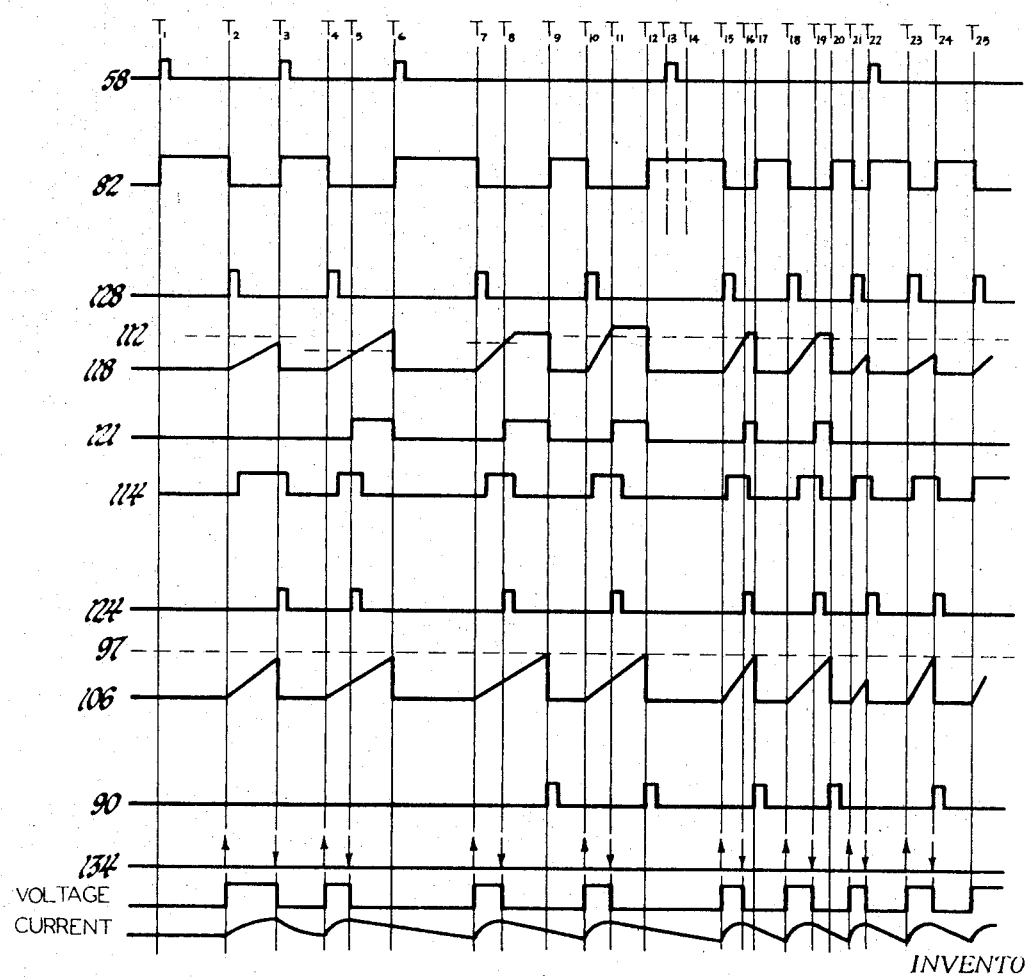
FIG. 7 is a graph of wave forms of signals at various points in the circuit shown in FIG. 4.

The operation of the logic circuit of FIG. 4 is understood from the wave forms of the various voltages on the lines as indicated in FIG. 7. A time sequence is shown starting at time T1 with the graph being understood to represent different individual operating conditions during various motor and inverter frequencies. Idealized motor voltage and resulting motor current are shown at the bottom of the FIG. 7 with voltage signals in the upper graphs showing how control is provided by the logic circuit of this invention.

In the graph of wave forms in FIG. 7, the lines on which the voltage pulses occur are indicated by number on the left side of the graph and they respectively correspond to the numbers of the lines shown in FIG. 4. The timing pulses occurring on line 58 are shown at the top of the graph and the first timing pulse at T1 is shown occurring during a high motor speed range where the average voltage applied to the motor is determined by two consecutive timing pulses. In operation, a timing pulse is applied from the pulse generator 14 through the AND gate 74 to lines 58 with the system on so that a "Go" logic signal occurs on line 62. One of the lines 58 is applied to the power trigger circuit OR gate 126 which would supply a shut-off pulse but it is assumed that the power pulse in the inverter has already been shut-off and therefore no shut-off pulse will be generated because of the power trigger sequence control of circuit 78 described above. The timing pulse is also applied to the phase sequence control circuit 60 so that different phase current path will be establish in the motor by the timing pulse.

Also the timing pulse is applied to the reset circuit 76 and the variable pulse width generator 80 which is reset as described in connection with FIG. 5 and thereby initiates the leading edge 102 of reset pulse 100. The reset pulse 100 on line 82 is simultaneously applied to the duty cycle control circuit 84 to start reset of the ramp voltage source 108 and the ramp voltage source 94 in internal clock circuit 86. The third output of reset pulse 100 is applied to the differentiating and inverter circuit 132 so that the trailing edge 104 of the reset pulse 102 will trigger generator 122 and provide at turn-on trigger pulse. The duration of the reset pulse 100 determines the delay or dead time as programmed by the function generator 148 of FIG. 5. When the ramp voltage from source 150 reaches the level of the function generator a comparator pulse will be generated to reset the bistable circuit 154 and provide the trailing edge 104 of the reset pulse 100. This occurs at time T2 in FIG. 7 and a turn-on trigger is generated on line 128 and is applied to the pulse distribution circuit 130 where it is applied as a turn-on gating signal on lines 134 to turn on a pair of control rectifiers in the inverter circuit. The upward and downward arrows at 134 in FIG. 7 indicate turn-on and shut-off gating pulses respectively supplied on lines 134. The trailing edge 104 of the reset pulse also unclamps the internal clock ramp voltage source 94 and duty cycle ramp voltage source 108 so that the voltage ramps are generated at the outputs 106 and 118 respectively. Reference voltages on the lines 97 and 112 applied to the comparators 96 and 116 of circuits 86 and 84 respectively are not reached by the respective ramp voltages because a second timing pulse on line 58 occurs at T3. The timing pulse is applied to the power control trigger network gates 126 and 138 to generate a shut-off trigger pulse from pulse generator 120. A shut-off gating signal at the output 134 of pulse distribution 130 is applied to the inverter to commutate a conducting controlled rectifier to shutoff and terminate the motor voltage pulse at T3. It can be seen that a single voltage pulse will be supplied to the motor between T1 to T3.

At time T3, a timing pulse again occurs on line 58 at the next 60 electrical degree interval of the inverter frequency to initiate a pulse cycle as described for the timing pulse occurring at timing pulse T1. With time T4 the duty cycle ramp voltage on line 118 begins to rise toward the reference voltage on line 112 which has a lower level following T3. The variation of the duty cycle comparator level on line 112 is determined by the integration of the difference between desired duty cycle on line 66 and actual duty cycle on line 114. The wave forms of signals occurring on line 114 are produced by the 1 output of bistable circuit 144 and it can be seen that the waveshape of the signals on line 114 has the same duty cycle as the motor voltage power pulses. When the reference level is reached, a pulse to initiate the shut-off trigger from comparator 116 is produced on line 121 at time T5. The motor input voltage pulse width between the times T4–T5 is determined by the duty cycle control circuit 84. Thus, it is seen a shut-off pulse can be generated either by timing pulses on line 58 or duty cycle control pulses on line 121.

Another timing pulse occurs at T6 providing the reset pulse on line 82 to again reset the ramp voltages on lines 106 and 118 and to initiate another power turn-on at T7 after the delay or dead time of circuit 76.

The interval beginning with the timing pulse at T6 corresponds to operation at a lower frequency range when the internal clock circuit 86 is effective to produce additional power pulses between the 60° intervals. The timing pulse at T6 starts a reset pulse 100 on line 82 which terminates at T7 to initiate a turn-on trigger pulse. The ramp voltages are unclamped in circuits 94 and 108 and continue to rise with the ramp voltage on 118 reaching the reference level of duty cycle comparator 116 at T8. The ramp voltage 118 continues to rise until a clamp circuit, not shown, acts to limit further rise of the ramp. A shut-off control pulse is provided on line 121. The internal clock ramp voltage continues to rise on line 106 until T9 when the trigger level of comparator 96 is reached and an internal clock pulse is produced on line 90. The fixed pulse width generator 88 now provides the reset pulse starting at T9. Both the duty cycle ramp and internal clock ramp voltages are reset and a clock pulse from line 90 is applied to the OR gate 126 but no shut-off trigger pulse is produced since a shut-off was previously produced by the duty cycle circuit at T8. The cycle is repeated starting at T10 as started at T7 and ends with an internal clock pulse at T12. The internal clock pulse occurring at T12 again produces the reset function in the fixed pulse width generator 88 starting with the leading edge of the reset pulse on line 82. At time T13 a timing pulse occurs at a 60° interval and an output from variable pulse width generator circuit 80 occurs prior to the end of the pulse from 88 which ends at T14. The two pulses overlap while passing simultaneously through OR gate 70 during T13 to T14. The trailing edge 104 of the reset pulse on line 82 occurs at T15 at the end of the pulse developed by circuit 80. The cycle of pulses between T15 and T20 is the same as described as occurring between T7 and T12. At T21 the trailing edge of the reset pulse occurs and this reset pulse was initiated by the internal clock pulse occurring at T20 on line 90. At this time a gating pulse starts another output voltage pulse and both ramp voltages are started on lines 106 and 118. At T22 both ramps are reset before either ramp reaches its respective trigger reference voltage since a timing pulse then occurs. This is the same condition that existed at T3 except following T21 the timing pulse at T22 shuts off a voltage pulse which had been initiated by an internal clock pulse. The pulse cycle again begins to repeat at T23. The internal clock ramp voltage reaches the trigger level of 97 at T24 before the duty cycle ramp voltage on line 118 reaches its trigger reference level on line 112. This condition may occur at low speeds when the duty cycle error voltage is high and the ramp voltage rate of rise is less than the rate of rise of the internal clock ramp voltage so that the reference level of the internal clock comparator is reached first.

It is seen then that the logic is synchronized by the timing pulses on line 58 and that shut-off trigger pulses from circuit 120 can occur either under the control of the internal clock pulse circuit 86 or the duty cycle control circuit 84 or if the shut-off is not provided by either circuits 86 or 84 a shut-off can be provided by the timing pulse which also initiates a new turn-on trigger pulse after the programmed dead time. It can also be seen that there will always be a delay interval between the power shut-off gating pulse and the power turn-on gating pulse as determined by the width or dead time of the reset pulse so that the inverter and motor circuits are conditioned for a new pulse and a change in the phase sequence.

While the embodiment of the present invention as herein disclosed constitutes a preferred form it is to be understood that other forms might be adopted.

I claim:

1. A logic control system for controlling the output of a polyphase inverter circuit having a plurality of semiconductor switches controlled by signal pulses produced from said logic control system, comprising: an external source of regularly occurring timing pulses; an internal frequency control circuit including means for developing a first time varying signal when energized and means for producing an internal frequency control pulse when said first time varying signal reaches a predetermined value; a duty cycle control circuit including means for developing a second time varying signal when energized and means for producing a duty cycle control pulse when said second time varying signal reaches a predetermined value; means for energizing both said internal frequency control circuit and said duty cycle control circuit in response to the occurrence of one of said timing pulses; means for producing turn-on pulses operative to generate a polyphase output signal in said polyphase inverter circuit in response to each of said timing pulses; means for producing shut-off pulses operative to terminate said polyphase output signal in response to each of said timing pulses and for producing said shut-off pulses between said timing pulses in response to either of said internal frequency control pulse and said duty cycle control pulse when said first or said second time varying signals reach said predetermined values; and means responsive to said internal frequency control pulse for producing said turn-on pulses and energizing both of said duty cycle control and said internal frequency control circuits between the occurrence of consecutive timing pulses.

2. A logic control system for controlling the output of an inverter circuit having semiconductor switching devices, comprising: a source of gating signals producing turn-on and shut-off gating signals operative to control the conduction time of said semiconductor switching devices; a source of logic command signals; a first signal source for producing a first series of timing signals; a second signal source for producing a second series timing signals between consecutively occurring timing signals of said first series of timing signals, said first and said second signal sources both operatively connected to said source of gating signals for initiating said turn-on gating signals, thereby determining the rate of rendering said semiconductor switching devices conductive so as to control the frequency of signals developed at the output of said inverter circuit; a source of duty cycle control signals operatively connected to said source of gating signals for initiating said shut-off signals in response to said logic command signal for maintaining a predetermined level of the signals developed at the output of said inverter circuit.

3. A logic control system for controlling the output of an inverter circuit having semiconductor switching devices, comprising: a source of gating signals producing turn-on and shut-off gating signals operative to control the conduction time of said semiconductor switching devices; a source of logic command signals; a first signal source for producing a first series of timing signals; a second signal source for producing a second series of timing signals between consecutively occurring timing signals in said first series of timing signals, said first and said second signal sources both operatively connected to said source of gating signals for initiating turn-on gating signals, thereby determining the rate of rendering said semiconductor devices conductive so as to control the frequency of signals developed at the output of said inverter circuit; a source of duty cycle control signals operatively connected to said source of gating signals for initiating shut-off signals including means for producing a reference signal having a value corresponding to a time integral of an error signal developed from the difference in the level of said logic command signal and the level of a signal which is variable in response to the duty cycle of said signals developed at the output of said inverter, said source of duty cycle control signals further including means including a source of linear time varying signals initiated in response to eitherof said first and said second series of timing signals and means for initiating said shut-off gating signals upon said linear time varying signals being terminated by reaching the value of said reference signal whereby said source of duty cycle control signals maintains a constant duty cycle in said inverter ciricuit in response to said logic command signal to maintain a predetermined level of the signals developed at the output of said inverter circuit while variations occur in the frequency of either of said first and second timing signals.

4. A logic control system for controlling the output of an inverter having a plurality of semiconductor switching devices for developing controlled power signals from a source of electrical power comprising: a source of turn-on gating signals for initiating conduction of at least one of said semiconductor switching devices; a source of shut-off gating signals for initiating turn-off of conduction of said at least one of said semiconductor switching devices; a source of input control signals connected to the inputs of both of said sources of turn-on and shut-off gating signals for initiating said turn-on and shut-off gating signals; and a sequence control means operatively conected to the outputs of both of said sources of turn-on and shut-off gating signals for alternately enabling one of said sources of turn-on and shut-off gating signals and disabling the other of said sources of turn-on and shut-off gating signals so that said turn-on and shut-off gating signals are alternately initiated from said sources of turn-on and shut-off gating signals, whereby consecutive occurrences of two or more turn-on gating signals or two or more shut-off gating signals are prevented.

5. A logic control system for controlling the output of an inverter having a plurality of semiconductor switching devices for developing controlled power signals from a source of electrical power comprising: a source of turn-on gating signals for initiating conduction of (a) at least one of said semiconductor switching devices; a source of shut-off gating signals for initiating turn-off of a conducting said at least one of said semiconductor switching devices; a source of input control signals connected to the inputs both of said sources of turn-on and shut-off gating signals for initiating said turn-on and shut-off gating signals; and a sequence control means including a bistable switching circuit and a pair of AND logic gating circuits, said bistable switching circuit including a pair of inputs and a pair of outputs, said pair of inputs separately connected to one of the outputs of said sources of turn-on and shut-off gating signals and being switched from one state to a second state in response to one of said turn-on and shut-off gating signals and being further switched from said second state to said first state in response to the other of said turn-on and shut-off gating signals, each of said pair of AND logic gating circuits including a first input and an output connecting one of said pair of AND logic gating circuits between said source of input control signals and one of said sources of turn-on and shut-off gating signals, said pair of AND logic gating circuits further including second inputs respectively connected to one of said pair of outputs of said bistable switching circuit for alternately enabling one of said sources of turn-on and shut-off gating signals and disabling the other of said sources of turn-on and shut-off gating signals so that said turn-on and shut-off gating signals are alternately initiated from said sources of turn-on and shut-off gating signals, whereby consecutive occurrences of two or more turn-on gating signals or two or more shut-off gating signals are prevented.

References Cited

UNITED STATES PATENTS

| | | | |
|---|---|---|---|
| 3,317,805 | 5/1967 | Kay et al. | 318—231 |
| 3,418,557 | 12/1968 | Schaefer | 321—18 |
| 3,444,451 | 5/1969 | Schlabach et al. | 318—231X |

WILLIAM H. BEHA, JR., Primary Examiner

U.S. Cl. X.R.

321—18